(12) United States Patent
Ahuja et al.

(10) Patent No.: US 11,704,345 B2
(45) Date of Patent: Jul. 18, 2023

(54) INFERRING LOCATION ATTRIBUTES FROM DATA ENTRIES

(71) Applicant: INTERNATIONAL BUSINESS MACHINES CORPORATION, Armonk, NY (US)

(72) Inventors: Shilpi Ahuja, San Jose, CA (US); Thomas Kemp, London (GB); Charles D. Wolfson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 258 days.

(21) Appl. No.: 16/239,613

(22) Filed: Jan. 4, 2019

(65) Prior Publication Data

US 2020/0218741 A1 Jul. 9, 2020

(51) Int. Cl.
*G06F 16/29* (2019.01)
*G06F 16/22* (2019.01)
*G06F 16/909* (2019.01)
*G06N 20/00* (2019.01)
*G06N 5/04* (2023.01)

(52) U.S. Cl.
CPC ............ *G06F 16/29* (2019.01); *G06F 16/221* (2019.01); *G06F 16/909* (2019.01); *G06N 5/04* (2013.01); *G06N 20/00* (2019.01)

(58) Field of Classification Search
CPC ...... G06F 16/29; G06F 16/221; G06F 16/909; G06N 20/00; G06N 5/04
See application file for complete search history.

(56) References Cited

U.S. PATENT DOCUMENTS 6,278,660 B1  8/2001  Tognazzini
7,921,072 B2  4/2011  Bohannon
(Continued)

FOREIGN PATENT DOCUMENTS

WO  2006103398 A1  10/2006
WO  2012006509 A1  1/2012

OTHER PUBLICATIONS

"Hadoop Cluster Overview", first page, retrieved on Mar. 15, 2021 from the Internet: <URL: https://community.simplilearn.com/threads/hadoop-cluster-overview.30013/>, date Nov. 20, 2017, 1 page.
(Continued)

*Primary Examiner* — Sherief Badawi
*Assistant Examiner* — William P Bartlett
(74) *Attorney, Agent, or Firm* — Schmeiser, Olsen & Watts, LLP; Rakesh Roy

(57) ABSTRACT

A system and method are provided for inferring location attributes from data entries. The method comprises for data entries in a structured data set format, a computer system selecting a sample of rows. The computer system then identifies columns containing geospatial and temporal information based on the column headings. The computer system next identifies location information within the structured data set. The computer system determines implied location information based on the identified location information. The computer system derives location values based on the identified and implied location information using consolidation rules, resulting in a final set of location attributes for the data entries. The computer system then associates the final set of location attributes with the data entries.

20 Claims, 16 Drawing Sheets

| | | | | | |
|---|---|---|---|---|---|
| Filename | san-diego-claims-list.csv | san diego | • San Diego, California, United States,<br>• San Diego, Texas, Unites States | Yes,<br>Yes | USD |
| Column 1 row 1 | 2920 Zoo Dr. San Diego, CA 92101 | 2920 Zoo Dr, San Diego, CA 92101 | 2920 Zoo Dr, San Diego, CA 92101, United States | Yes | USD |
| Column 1 row 2 | 9449 Friars Rd, San Diego, CA 92108 | 9449 Friars Rd, San Diego, CA 92108 | 9449 Friars Rd, San Diego, CA 92108 United States | Yes | USD |
| Column 2 row 1 | $1.50 | $ | USD, AUD, CAD, NZD | - | USD, AUD, CAD, NZD |

(56) References Cited

U.S. PATENT DOCUMENTS

| | | | |
|---|---|---|---|
| 7,948,832 B1 | 5/2011 | Luo | |
| 8,649,777 B2* | 2/2014 | Witzel | H04L 67/24 |
| | | | 455/414.1 |
| 8,650,024 B1* | 2/2014 | Snellman | G06F 40/157 |
| | | | 704/9 |
| 2003/0217069 A1 | 11/2003 | Fagin | |
| 2012/0124079 A1* | 5/2012 | Kinsella | G06F 16/487 |
| | | | 707/769 |
| 2014/0337358 A1* | 11/2014 | Mitra | G06F 16/248 |
| | | | 707/748 |
| 2015/0039623 A1 | 2/2015 | Pandit | |
| 2018/0075104 A1* | 3/2018 | Oberbreckling | G06F 16/221 |
| 2018/0096001 A1* | 4/2018 | Soza | G06F 16/2358 |
| 2018/0165272 A1 | 6/2018 | Pasquini | |
| 2018/0262864 A1* | 9/2018 | Reynolds | G06F 21/6245 |
| 2019/0180358 A1* | 6/2019 | Nandan | G06Q 40/02 |
| 2019/0331500 A1* | 10/2019 | Long | G06F 16/29 |

OTHER PUBLICATIONS

Mell, Peter et al.; "The NIST Definition of Cloud Computing;" National Institute of Standards and Technology; Special Publication 800-145; Sep. 2011; 7 pages.

\* cited by examiner

| DateTime_Received |
|---|
| 10/1/2010 9:04 |
| 10/1/2010 11:37 |
| 10/1/2010 13:18 |
| 10/1/2010 13:45 |
| 10/1/2010 14:06 |

FIG. 3a

| ExtractDate |
|---|
| 12/2/2015 |
| 12/2/2015 |
| 12/2/2015 |
| 12/2/2015 |
| 12/2/2015 |
| 12/2/2015 |

FIG. 3b

| DateTime_Received | Address | Cross_Street | Zip | Lat | Lng | SubCategory |
|---|---|---|---|---|---|---|
| 10/1/2010 9:04 | NULL | AUZERAIS & SAN CARLOS | 95126 | 37.32102 | -121.908 | GAR - Garbage |
| 10/1/2010 11:37 | 556 ST JOHN | 12TH | 95112 | 37.34313 | -121.88 | FUR - Furniture |
| 10/1/2010 13:18 | 2440 SAMARITAN | ELESTER | 95124 | 37.25109 | -121.945 | OTH - Other |
| 10/1/2010 13:45 | NULL | DRAKE | 95125 | 37.32022 | -121.9 | FUR - Furniture |
| 10/1/2010 14:06 | NULL | LINCOLN | 95126 | 37.31488 | -121.906 | FUR - Furniture |

FIG. 4a

| ExtractDate | OrganisationL | ServiceTypeUR | LocationText | GeoX | GeoY | G |
|---|---|---|---|---|---|---|
| 12/2/2015 | Bournemouth | http://id.esd.o | Boscombe Bus Static | 411533.7 | 92065.02 | h |
| 12/2/2015 | Bournemouth | http://id.esd.o | Hengistbury Head | 418076.6 | 90759.48 | h |
| 12/2/2015 | Bournemouth | http://id.esd.o | East Overcliff | 409525.6 | 90955.17 | h |
| 12/2/2015 | Bournemouth | http://id.esd.o | Firbank Road | 409844.2 | 93642.47 | h |
| 12/2/2015 | Bournemouth | http://id.esd.o | Fishermans Walk | 412935.2 | 91813.08 | h |
| 12/2/2015 | Bournemouth | http://id.esd.o | Fishermans Overclif | 412983.1 | 91361.69 | h |

FIG. 4b

"Austin_store_sale.csv" — Central Time

| Store Manager | Store Name | Record Manager | Sale date |
|---|---|---|---|
| Tony Passaquale | Sams Groceries, | Chris Huffman | 2/22/1999 21:59 |
| Nigel "Shan" Shanford | Fulton Hotels Inc | Chris Huffman | 4/5/1999 16:34 |
| Selma Cooper | Cooper Inns | Chris Huffman | 4/5/1999 16:31 |
| Allen James | City Center Lodg | Chris Huffman | 4/5/1999 16:31 |

FIG. 5a

"SanFrancisco_fire_dept_calls.csv" — Pacific Time

| Call Number | Call Type | Call Date | Received DtTm | Unit Type |
|---|---|---|---|---|
| 163380006 | Medical Inc | 12/2/2016 | 12/2/2016 23:56 | MEDIC |
| 163380005 | Medical Inc | 12/2/2016 | 12/2/2016 23:59 | ENGINE |
| 163380005 | Medical Inc | 12/2/2016 | 12/2/2016 23:59 | MEDIC |
| 163374204 | Alarms | 12/2/2016 | 12/2/2016 23:53 | TRUCK |
| 163374204 | Alarms | 12/2/2016 | 12/2/2016 23:53 | ENGINE |

FIG. 5b

"San_Francisco_budget.csv"

| Fiscal Yea | Revenue | Organization Group | Department | Program | Amount |
|---|---|---|---|---|---|
| 2013 | Spending | General Administration & Fina | Assessor/Recorder | Technical | 28840 |
| 2015 | Spending | Human Welfare & Neighborho | Human Services | No Progra | -17045739 |
| 2013 | Spending | General Administration & Fina | Human Resources | Workers C | 3547603 |
| 2016 | Spending | Culture & Recreation | Recreation and Park Comr | Parks | 198703 |

FIG. 6a

"San_Francisco_Development_Pipeline_2016_Q1.csv"

| PROJECT_TYPE | BESTDATE | BESTSTAT | COST | FirstFiled | NEIGHBORHOOD | LOCATION |
|---|---|---|---|---|---|---|
| CIE | 12/17/2015 | BP FILED | $600,000.00 | 11/17/2015 | Bayview | (37.211103, -121.807151) |
| Resident | 5/8/2015 | BP FILED | $300,000.00 | 5/8/2015 | Ocean View | (37.211103, -121.807151) |
| Mixres | 3/28/2016 | CONSTRUCTIO | $11,000,000.00 | 12/3/2009 | Downtown/Civic Cent | (37.211103, -121.807151) |
| Resident | 3/17/2016 | CONSTRUCTIO | $45,000,000.00 | 5/31/2012 | South of Market | (37.211103, -121.807151) |

$ = USD, CAD, NZD, AUD ...

FIG. 6b

| event code | event name | event date | start time | end time | street address | city | zip | projected cost |
|---|---|---|---|---|---|---|---|---|
| E224 | Intern welcome event | 7/7/2016 | 6:00 PM | 11:00 PM | 425 Market St | San Francisco | 94105 | 1,500 |
| E543 | 30 year celebrations | 10/21/2016 | 10:00 AM | 4:00 PM | 650 Harry Rd | San Jose | 95120 | 10,100 |
| E234 | Intern welcome event | 7/10/2016 | 5:30 PM | 10:00 PM | 3565 Harbor Blvd | Los Angeles | 92626 | 2,500 |

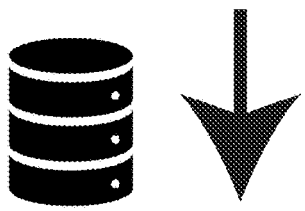

STREET = 425 Market St., CITY = San Francisco, STATE = CA, ZIP CODE = 94105, COUNTRY = United States, CONTINENT = North America STREET = 650 Harry Rd., CITY = San Jose, STATE = CA, ZIP CODE = 95120, COUNTRY = United States, CONTINENT = North America STREET = 3565 Harbor Blvd., CITY = Los Angeles, STATE = CA, ZIP CODE = 92626, COUNTRY = United States, CONTINENT = North America

FIG. 11

```
{
    filename: "california_event_costs.csv",
    locale: {
        state: "California",
        country: "United states"
        attributes: {
            currency: { code: "USD", confidence: 0.9 }
            time_zone: { code: "PST", confidence 0.8 },
            date_format: { code: "MIDDLE_ENDIAN", confidence: 0.85}
        }
    }
}
```

INFERRING LOCATION ATTRIBUTES FROM DATA ENTRIES

TECHNICAL FIELD

The present invention provides a system and method for integrating data, and more particularly, the invention relates to a system and method for using contextual clues to infer implicit data values.

BACKGROUND

Identifying and classifying useful data relating to data entries is an important step in data integration and analytics. Data with differing formats and value types typically cannot be integrated or combined.

SUMMARY

An embodiment of the present invention relates to a method, and associated computer system and computer program product, of inferring location attributes from data entries, wherein the data entries are in the form of a structured data set. One or more processors of a computer system select sample rows from each column of the structured data set. The one or more processors of the computer system identify columns containing geospatial and temporal information within the structured data set utilizing machine learning techniques. The one or more processors of the computer system identify location information within the structured data set using entity recognition techniques. The one or more processors of the computer system determine implied location information based on the identified location information. The one or more processors derive location values based on the identified and implied location information using consolidation rules, resulting in a final set of location attributes for the data entries. The one or more processors of the computer system then associates the final set of location attributes with the data entries.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 3a and 3b illustrate an example of a data table including dates which are analyzed according to an embodiment of the present invention.

FIG. 4a illustrates an expanded data table having different columns of data that are used to illuminate the concepts according to embodiments of the present invention.

FIG. 4b illustrates an expanded data table having geospatial attribute utilized to perform the element according to an embodiment of the present invention.

FIG. 5a illustrates an expanded data table having a file name and date information utilized to perform the element according to an embodiment of the present invention.

FIG. 5b illustrates an expanded data table having a file name and transaction information utilized to perform the element according to an embodiment of the present invention.

FIG. 6a illustrates an expanded data table having a file name and monetary information utilized to perform the element according to an embodiment of the present invention.

FIG. 6b illustrates an expanded data table having a file name and monetary symbol information utilized to perform the element according to an embodiment of the present invention.

FIG. 11 illustrates an analysis of a data table used to derive locale information according to an embodiment of the present invention.

FIG. 14 illustrates a data structure for outputting the final set of locale attribute according to an embodiment of the present invention.

DETAILED DESCRIPTION

Figure 1:
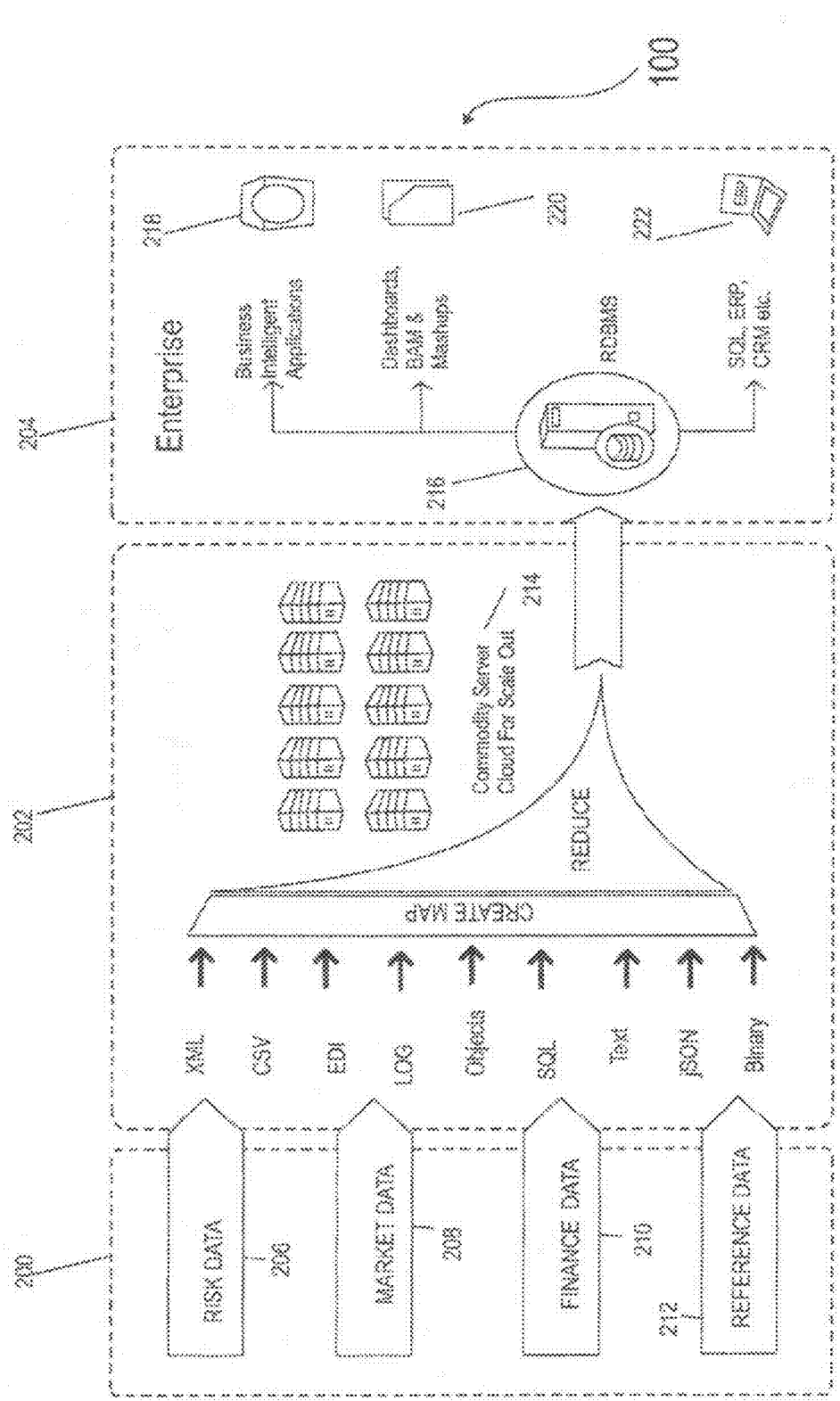
FIG. 1 shows a schematic diagram of a system in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

As required, a detailed illustrative embodiment of the present invention is disclosed herein. However, techniques, systems and operating structures in accordance with embodiments of the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Data integration and classification is a common problem in all domains. There are lots of tools that make it easy and powerful to visualize, experiment with, and explore data. However, the results they produce are often insufficient because of poor classification or aggregation of data with relevant datasets. As a result, the consumer is often provided with only a subset of results.

The underlying problem is not due to human negligence but more so due to the effort involved in inferring data-values or types that are required for proper data integration or analytics. The problem is substantial when considering structured data-sets such as flat files. The files do not share common schemas (column labels, formats, etc.). They could also represent data from different locations, therefore, making lot of assumptions about the implicit values and formats used in those locations. The data conflict complicates the aggregation these data-sets. For example: date format, time format, time zone, currency, character sets, sort criterion are key attributes that are not readily available in the input data-set and has be inferred from a locale—place where data is generated or data is applicable to. However, the locale information isn't transparent to the user.

Today, there are systems and methods available for data integration from predetermined data sources. These systems and methods integrate data but are unable to meet the needs of the industry because they are limited to a specific number of data sets at a time, and/or require the source data set to be modified or manipulated before the system and methods can integrate successfully. Further, these systems and methods can integrate only when the data sources have at least one dimension with unique values to match records. Other systems and methods that attempt multiple data set integration are also available. However, these solutions do not meet the needs of the industry because they only perform a simple join operation and not the multiple types of joins defined by industry standards.

Further, other systems available seek to integrate data from multiple data sets, but these systems also fail to meet industry needs because they are not able to match records with data that is literally different but semantically identical.

Currently, organizations store their data in relational databases and/or data files from various computer applications. The relational databases provide several methods to retrieve data from multiple tables within a database, using commands like JOIN on a field common to both tables, GROUP BY to restrict the operation to return a subset of data, and the like. As organizational needs have resulted in a multitude of applications that store the data in databases (each with their own schemas), it is difficult and laborious to integrate the data from multiple databases using existing tools. Moreover, it is almost impossible when there is no common identity to correlate the data contained in the different databases or non-database data sources. The prior art data integration systems employ fuzzy or set-similarity joins using the MapReduce process for exact matching, in addition to the usual approximate matching techniques, such as locality-sensitive hashing.

Therefore, data integration solutions that integrate data from multifarious high volume data sources, ranging from SQL to text or binary data sources, having structured as well as unstructured data and complex data relationships to provide comprehensive analytics and reporting are absent in the prior art. Further, the prior art data integration solutions do not interface seamlessly with traditional and leading edge systems for optimal performance, and do not intelligently analyze user-defined relationships and provide effective complex heuristic data to integrate with major Big Data and NoSQL products that involves machine learning in a heuristic manner.

A request to board new data can originate from clients or from domain experts such as data scientists who partner with clients and help them develop insights from their data-sets. Often data is also downloaded from the internet simply for research and investigation purposes. One challenge is integrating these data-sets with existing data and dynamically deducing the timeline represented by these data-sets.

Given only a structured data-set (such as a flat file), an exemplary embodiment of the present invention provides a method to derive implicit data values (such as time zones, currency, date formats, time formats etc) applicable to columns of the data-set by inferring the locale information from the data-set. The locale information is inferred using the contextual information available in the file. The method is applicable, for example, in the following situations: (1) where locale information is implied by file name; (2) where locale information is implied by column labels: (3) where locale information is implied by column values; (4) where locale information is implied by additional metadata associated with the file (such as author name, comments, file description etc); and (5) where we know general locale information about the organization that created the file and can combine this knowledge with clues from within the file.

Locale clues are identified in the data tables themselves and the plurality of clues are combined using a set of consolidation rules to give a final set of locale attributes for the file. These attributes can then be used during data integration to ensure two files have matching locale attributes (e.g. financial values are in USD in both files), or to indicate that some form of transformation needs to occur if the two files are to be combined. Further details of the system and method of embodiments of the present invention will be described in more detail below.

The foregoing objects of the invention are accomplished and the problems and shortcomings associated with the prior art techniques and approaches are overcome by the present invention as described below.

Embodiments of the present invention provide a system and method for integrating data which solves the deficiencies known in the art. The present invention, when practiced, will greatly improve the data integration process. The system and method, when practiced, will improve computer functionality by providing semantic, multi-dimensional data integration which provides a computerized data process which simultaneously integrates multiple data sets from different sources into a single, de-duplicated data set using multi-dimensional mapping of semantically identical data to be used in a plurality of applications or data storage uses, significantly increasing the efficiency, accuracy, and speed in which these applications or data storage uses can be performed and function. An embodiment of the present invention is a computerized data process to integrate multiple data sets in a single operation increasing the efficiency of the process, thereby resulting in an improvement in data integration technology. When the data sets to be integrated are from different locations there is an implicit assumption in how certain attributes are represented in the data set. For example, data-formats, sales figures, dates, or locations have no mention of the currency or time-zone at all (e.g., sale figures may just be numbers like 1,000, instead of $1,000). The systems and methods discussed below provide substantial value by supplying this additional metadata needed for data integration.

The present invention, when practiced, may result in integrated data which can be deployed within an application or data storage use. For example, the method and system may allow for more efficient data storage methods by using multi-dimensional mapping of semantically identical data, linking said data, thereby simultaneously creating an analytical model which can be used for insights into the data. A data storage use may be a data ingestion platform, for example. Often data is downloaded from the internet simply for research and investigation purposes. The present invention, when practiced, is capable of integrating these data-sets with existing data and dynamically deducing the timeline represented by these data-sets. Deducing the timeline facilitates the discovery process of the data, thus saving valuable time. Moreover, the present invention, when practiced, can be deployed within computer applications, resulting in a faster, more efficient, and more accurate data processing and integration within the application.

Additionally, embodiments of the present invention will substantially improve data migration technology. When data needs to be migrated from one location to another, the issues discussed above are increasingly prevalent as the data to be migrated must be first integrated and be in consistent formats. As such, users preforming the migration must have as much information about the data as possible for a successful migration. Embodiments of the present invention, when practiced, can apply required data transformations automatically, thus saving valuable time for the user and reducing data integration errors at the receiving location.

The foregoing Summary, including the description of motivations for some embodiments and/or advantages of some embodiments, is intended to assist the reader in understanding the present disclosure, and does not in any way limit the scope of any of the claims.

Referring to FIG. 1, the data integration system 100 in accordance with embodiments of the present invention includes a high-volume data source 202, a big data environment or MapReduce environment 204 that may, for example, run the MapReduce process. MapReduce is a programming model and associated implementation for processing and generating large data sets with a parallel, distributed algorithm on a cluster. The system processes a plurality of data sources that include a risk data source 206, a market data source 208, a finance data source 210, and a reference data source 212 having a plurality of formats ranging from Extensible Markup Language (XML) to Binary files. Of course, this invention is applicable to any data source provided in the format discussed herein. The MapReduce environment 204 marshals a plurality of distributed servers 214, runs various tasks in parallel, and manages all communications and data transfers between the various parts of the system. The data is fed by the data sources to the servers in the commodity server cloud. The MapReduce environment 204 also provides for redundancy and fault tolerance. Fuzzy or set-similarity joins preferably use the MapReduce process to provide an exact matching technique to return correct output every time. The exact matching techniques are based on similarity of sets and/or may be based on length/prefix-based methods. These techniques are preferably parallelized and a Hadoop environment, an open-source software framework for storage and large-scale processing of data-sets on clusters of commodity hardware, is used for the purpose. A software program that is configured and enabled communicate with the server cloud and the plurality of data sources automatically and manually is provided in the system. The big data processed inside the MapReduce environment 204 is exported to enterprise environment 206. The data first flows to a Relational Database Management System (RDBMS) and stored therein. From the RDBMS, the data is further processed for enterprise applications, such as, for example, business intelligent applications, dashboards and mashups, and Enterprise Resource Planning (ERP), Service Oriented Architecture (SOA) and Customer Relationship Management (CRM) applications and services.

It is noted that the structural arrangement and data flow shown and described with reference to FIG. 1 is provided by way of example only and is not intended to limit the scope and/or manner of performing embodiments of the present invention.

Figure 2:
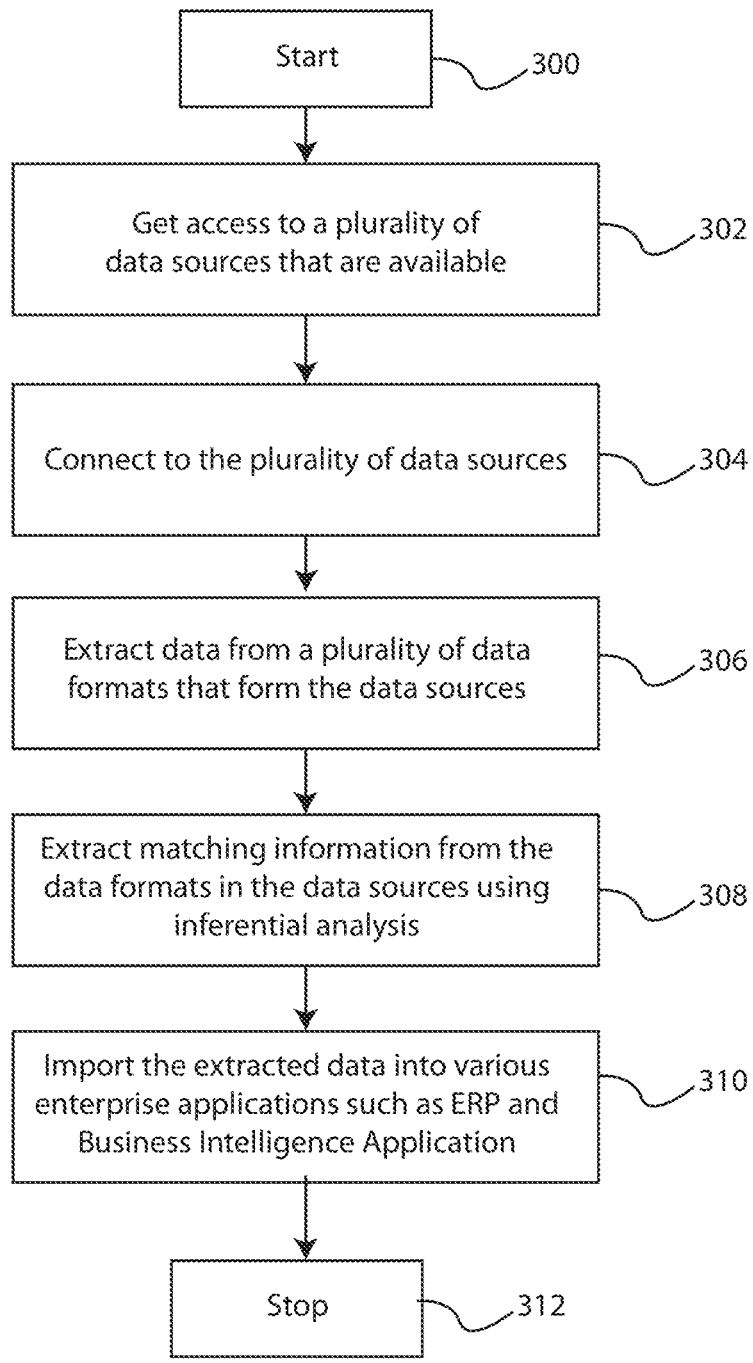
FIG. 2 illustrates a flowchart of a process employed by the system in accordance with embodiments of the present invention.

Referring to FIG. 2, a process employed by the system for semantic, multi-dimensional data integration is shown. The process for semantic, multi-dimensional data integration starts at step 300 and at step 302 the system gets access to the plurality of data sources available and moves to step 304. At step 304, the system 100 connects to the plurality of data sources 206, 208, 210 and 212 for extraction of data. The plurality of data sources 206, 208, 210 and 212 has a plurality of data formats such as, for example, Extensible Markup Language (XML), Extensible Stylesheet Language (XSL), Text files, Structured Query Language (SQL) files, Text files, JavaScript Object Notation (j SON) files, Comma Separated Value (CSV) files, Electronic Data Interchange (EDI) files, Log files and Objects, and the step moves to step 306. At step 306, the MapReduce processes are run in, for example, a Hadoop environment to extract matching information from the plurality of data formats that represent the plurality of data sources. The data provided by the data sources is preferably structured as in tables of an RDBMS. However, the system (200) is also capable of processing unstructured data. At step 308, the system infers certain format information from related data contained in the same data set as described in more detail below. At step 310, the system imports the extracted data and the inferred format into the applicable applications for analyzing and examining the extracted data.

FIGS. 3a and 3b illustrate an example of a data table including dates which are analyzed according to an embodiment of the present invention. By way of example, the present invention may be utilized to analyze time/date formats with other related data to ascertain the appropriate date format for each situation and data table. It is sometimes possible to get a good indication of the date format by analyzing the individual fields. For example, Jan. 25, 2017 is most likely to be in the mm/dd/yyyy format because 25 would be an invalid value for a month. This conclusion can be reached with a simple scan of the column. However, if the dates listed could be valid in multiple formats (as those in FIGS. 3a and 3b) then it is necessary to use locale information to help infer the format. FIG. 4a illustrates an expanded data table having different columns of data that are used to illuminate the concepts according to embodiments of the present invention. FIG. 4b illustrates an expanded data table having geospatial attribute utilized to perform the element according to an embodiment of the present invention. With reference to FIG. 4a, one may infer date format of the column "DateTime_Received" (dd/mm/yyyy or mm/dd/yyyy) so it may be necessary to integrate the date format with other data. For example, the date format may be inferred from the geospatial attributes "Lat" and "Lng" which accompany the same date data as shown in FIG. 4a, because the latitude and longitude may, as here, indicate a location within the United States. Similarly, one may infer the date format from the geospatial attributes "GeoX and "GeoY" (see FIG. 4b) to predict that the location is the United Kingdom, because these coordinates are located in the United Kingdom. From these inferences, one may determine the date format based on the country at issue. Thus, the system and method of this invention will correlate different types of dates to infer a solution to an ambiguity as described above.

FIG. 5a illustrates an expanded data table having a file name and date information utilized to perform the element according to an embodiment of the present invention. FIG. 5b illustrates an expanded data table having a file name and transaction information utilized to perform the element according to an embodiment of the present invention. With reference to FIGS. 5 a and 5b, one may infer time-zone applicable to the "Sale Date" or "Received DtTm" as shown in FIGS. 5a and 5b based on the related data for these features. Here, the "Sale date" data is stored in a file named "Austin_store_sale.csv" for FIG. 5a which is located in a central time zone of the United States. Similarly, the file name referenced in FIG. 5b refers to San Francisco which is located in the Pacific time zone. Thus, the time-zone here may be inferred or may be used to infer from the file name.

FIG. 6a illustrates an expanded data table having a file name and monetary information utilized to perform the element according to an embodiment of the present invention. FIG. 6b illustrates an expanded data table having a file name and monetary symbol information utilized to perform the element according to an embodiment of the present invention. With reference to FIG. 6a, one may infer a currency code for the budget amount shown in this file. In this example, the file name provided locale info (e.g., "San Francisco") that helped deducing the country code and therefore the currency code for the file as it related to the "Amount" column shown in FIG. 6a. In other words, because the city provided is San Francisco, it can be inferred that the country is the United States. From there, it can be further deduced that the amount is in U.S. Dollars.

With reference to FIG. 6b, one may infer currency associated with ambiguous currency symbol. The likely currency associated with the symbol has to be inferred using information contained in filename and "location" column, which indicate a city being "San Francisco" and the location coordinates (i.e., "Location" column) confirm this conclusion. Thus, FIG. 6b provides a two-part system to infer current from both a file name and a confirmation data located using coordinates in the location column.

In all these examples, it is important to determine locale-based attributes such as currency, date format and time zone before files can be integrated. It is extremely time consuming and inefficient to perform the steps of ascertaining currency, date format and time zone manually for thousands of these files, each containing a different format.

Figure 7:
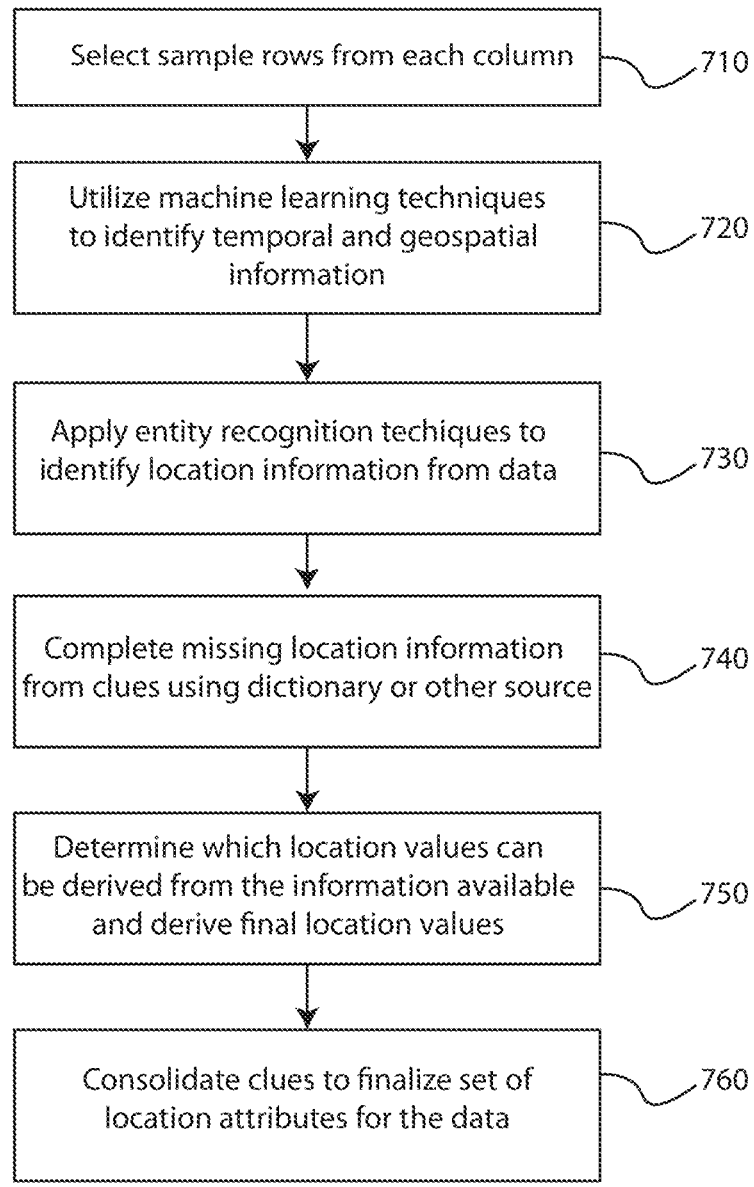
FIG. 7 is a flow chart showing steps to accomplish the format inferential method for data tables and data sources according to an embodiment of the present invention.
Figures 9, 10:
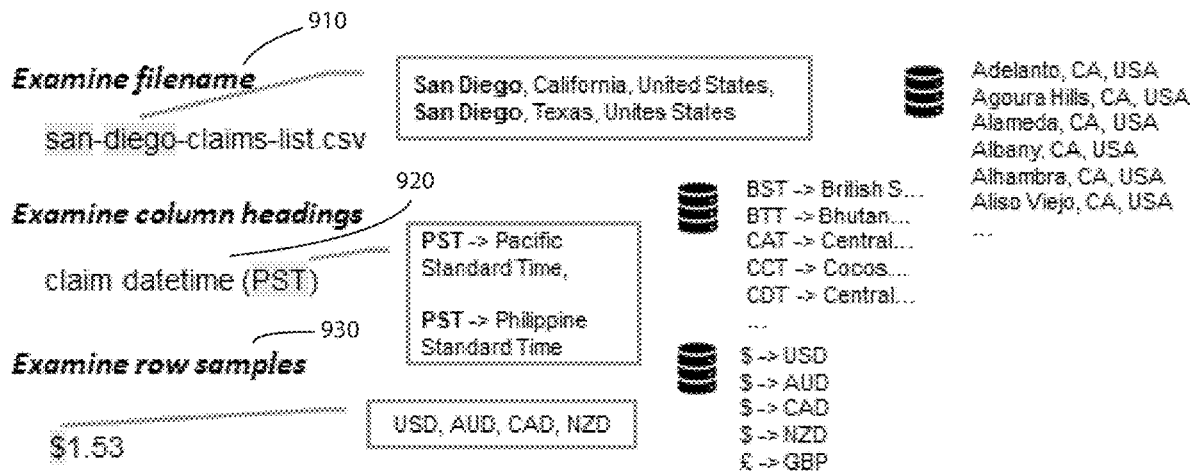
FIG. 9 shows an exemplary sample of rows and columns for processing according to an embodiment of the present invention.
FIG. 10 illustrates an analysis of a data table including a file name, time, and monetary information according to an embodiment of the present invention.

FIG. 7 is a flow chart showing steps to accomplish the format inferential method for data tables and data sources according to an embodiment of the present invention. At step 710, the system 100 will select a sample or rows for each column of a data table. More specifically, a representative sample should be taken of rows from each column of a structured data set. Otherwise processing would be excessively time-consuming for large files. There are a number of different strategies that could be adopted, such as 100 of the most frequent values. FIG. 9 shows an exemplary sample of rows and columns for processing according to an embodiment of the present invention. At step 720, the system 100 will use existing machine learning techniques) to identify temporal and geospatial information in the file. Both geospatial and temporal columns headings may provide clues to the file's locale and the system 100 will store the column labels for later use; e.g., column 1=zip code, column 2=date, column 3=city. FIG. 9 shows the designations of date, time, zip code, etc.

At step 730, the system 100 will employ named entity recognition techniques to identify explicit and implicit location information in filename, column headings and sample rows. For example, the system 100 may use dictionaries to identify named entities. Identify location information in the file name (e.g. "san_francisco_sales.csv": this implies the currency might be USD, for example). Identify explicit locale attributes in the filename, column headings and sample rows. For example, a column heading: "start date (PST)" contains the time zone information explicitly. As another example, the system 100 may use existing NLP techniques to extract named entities. This methodology could be as simple as tokenization and querying a dictionary of named entities for those tokens. For example, a filename called Austin_texas_sales_data.csv can be broken into the tokens "Austin", "texas", "sales", "data" and "csv", and then each token can be queried against a dictionary containing city names to identify Austin as a city. The same existing technique can be used to identify currencies (a dictionary of currencies), time zone names (a dictionary of time zone names) and a variety of other entity types. FIG. 10 illustrates an analysis of a data table including a file name, time, and monetary information according to an embodiment of the present invention. With reference to FIG. 10, a file name called "san-diego-claims-list.csv" 910 can be broken down into the tokens "san", "diego", "claims", "list" and "csv". Then, each token can be queried against a dictionary containing city names to identify San Diego as a city, and the city identity can be used to infer the temporal data such as time 920, currency 930, etc. The same inferential, applied here to cities, approach may be applied to zip codes, and other data providing specific locations, times, etc.

Next, at step 740, the system 100 will complete, or fill in, location information missing from clues using outside sources. For example, a dictionary or geocoding service can be used. This step 740 can be described as completing missing information or filling in implied information. FIG. 11 illustrates an analysis of a data table used to derive locale information according to an embodiment of the present invention. For example, with reference to FIG. 11 the system may fill in additional information that can be determined from the clues using a dictionary; e.g., if the file name contained "San Francisco, Calif.", then the system 100 may retrieve the country "United States" and continent "North America" from our dictionary and add it to the clue(s). The same may be true of zip code and other information. Basically, the system 100 may combine the various clues to determine a final classification for the file's locale attributes and combining the clues is the most complex step and is done by following a number of rules as described below. The clues include those the system 100 has extracted from the file and any metadata that has been specified about the file as a whole or its creator. For example, a file was created at IBM Almaden Research Lab in San Jose, Calif. The above-mentioned description relating to step 740 is just one exemplary means to complete this step.

Figures 12, 13:
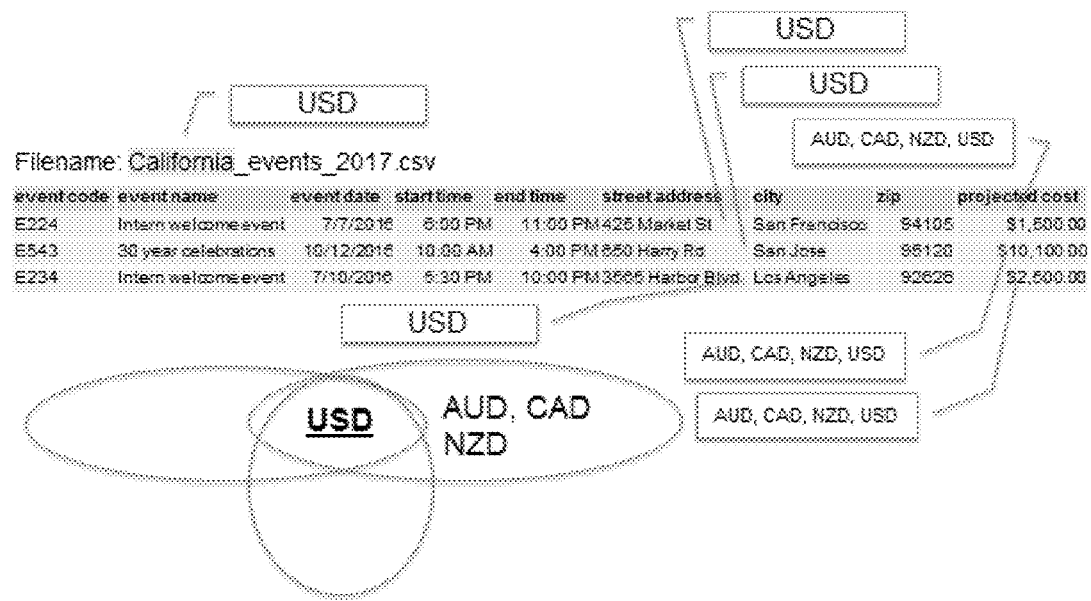
FIG. 12 illustrates an analysis table showing raw data strings, clues, interpretations and possible derivatives of the data according to an embodiment of the present invention.
FIG. 13 illustrates an additional example of a data table analysis according to an embodiment of the present invention.

Next, at step 750, the system 100 will determine which locale attributes can be derived from the information available. From the peripheral information, the system 100 may derive other locale attributes. Whether or not the system 100 can determine a particular local attribute (e.g. currency) from the level of location granularity previously collected will depend on the specific attribute. For example, a currency can be inferred if the system 100 determines the country of a clue. However, in the case of time zone, it may be necessary to know the location at coordinate level and, in some cases, towns/cities can be in multiple time zones. For each clue, use a database to derive local attributes if possible. FIG. 12 illustrates an analysis table showing raw data strings, clues, interpretations and possible derivatives of the data according to an embodiment of the present invention.

With reference to FIG. 12, the system 100 may examine each clue individually and use the locale attribute granularity dictionary to determine if the system has the required granularity for each attribute. A mapping should be built between each locale attribute and the level of granularity required to determine it. This can be built manually beforehand. For example, currency may be mapped to country. A range of granularities would be mapped to time zone: [coordinate, street, neighborhood, city, country]. If the system 100 knows a location to any of these granularities then the system 100 will query the database to determine if a time zone can be derived. How the actual attributes are derived depends on the attribute itself. For example: for currency, all that is necessary is a simple dictionary mapping country to a specific currency. Time zone information is more complex. Polygons/shape files exist for time zones. If a city's polygon is contained by exactly one time zone polygon then the system 100 will determine the city's time zone. If the city overlaps multiple time zones, then the system 100 need finer granularity. FIG. 12 provides certain raw data (raw string 1100) having a data location 1115 such as filename and row or column. The clue 1120 will provide enough information to infer an interpretation 1130 to arrive at a possible locale attribute 1140 such as currency.

At step 760, the system may consolidate clues to determine the most likely location attribute. A number of different clues have been generated within the file and the system 100 will consolidate these clues to give a final set of locale attributes for the file. This can be achieved using a set of rules. Explicitly defined locale attributes always take priority. FIG. 13 illustrates an additional example of a data table analysis according to an embodiment of the present invention. For example, with reference to FIG. 13, if a file name includes "San Francisco, Calif." implying PST as the time zone, but a column header explicitly defines UTC (e.g. "START_TIME_UTC"), then UTC will be chosen as the time zone. It will not always be possible to define one locale attribute for an entire file; e.g., two columns could explicitly define different currencies. If clues are implicit, then intersections of the set of possible values for a locale attribute can be taken. For example, the location in the filename implies USD, locations in rows imply USD, currency symbol of some rows is $, implying USD, CAD, AUD, NZD. The intersection of these would be USD. If the intersection of all clue values is empty, then the attribute could not be determined for the file. If the cardinality of the intersection is greater than one (1), then the system 100 may return multiple possibilities. This is just one possible consolidation strategy.

Figure 8:
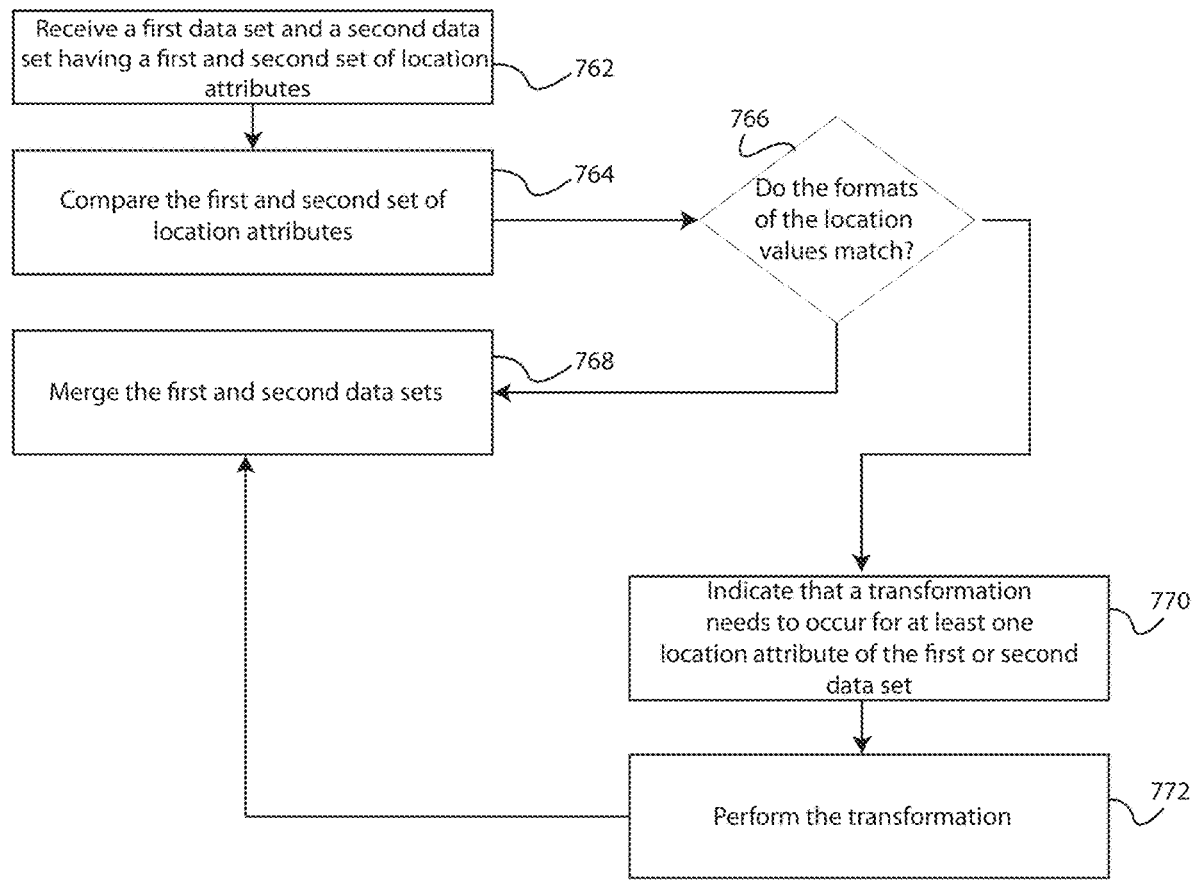
FIG. 8 is a flow chart showing steps to accomplish the format inferential method for data tables and data sources according to an embodiment of the present invention.

FIG. 8 is a flow chart showing steps to accomplish the format inferential method for data tables and data sources according to an embodiment of the present invention. The method starts at a first step 762 of receiving a first data set and a second data set, the data sets having a first and second set of location attributes respectively. These location attributes are determined by the method of FIG. 7. The method of FIG. 8 has a next step 764 of comparing the first and second set of location attributes. The method proceeds to a step 766 of determining whether the formats of the location values match. For example, the first data set may have dates in mm/dd/yyyy format and the second data set may have dates in dd/mm/yyyy format. Additionally, the first data set may have currency in US dollars, whereas the second data set has currency in British Pounds.

If it is determined that the formats of the location values of the first and second sets of location attributes match, the method of FIG. 8 may proceed to a step 768 of merging the first and second data sets. If it is determined that the formats of the location values of the first and second sets of location attributes do not match, the method proceeds to a step 770 of indicating that a transformation need to occur for at least one location attribute of the first or second data set. The method may end here by alerting users that the transformation must take place. In other embodiments, the method may proceed to a step 772 of performing the transformation. For example, the method may have preprogrammed conversions to automatically convert or transform the location values. In other embodiments, the conversions may be automatically retrieved from an outside source over a network. For example, currency exchange rates change daily and the method may need to retrieve up to date exchange rates to transform one currency to the desired currency. Once step 772 has occurred and the formats of the location values match, the method may then again proceed to step 768 of merging the first and second data sets.

FIG. 14 illustrates a data structure for outputting the final set of locale attribute according to an embodiment of the present invention. A final set of locale attributes should be outputted at step 770. An example of a possible output is shown in FIG. 14. The technique would be able to determine locale attributes with varying certainty so a confidence value should be outputted to give an indication of how reliable the inference is thought to be. A number of different possible values for a locale attribute could be returned, sorted by confidence. The confidence factor will be determined by the number of inferences the system relied upon to reach the final determination presented in the output. For each attribute, the confidence factor can be normalized to fall within a range of 0 to 100% (or 0.0 to 1.0) using a squashing function, $100/(1+\exp(-t))$, where 't' is the confidence estimate obtained from the corresponding confidence factor determined by the number of inferences the system relied upon. A plurality of the most likely candidates (e.g., based on the confidence estimates) may then be determined for each attribute. For example, the models may output a table in which the first column shows the category or attribute of interest, the second column shows the most likely column candidates for each of the categories, and the normalized confidence estimates are also displayed with each column.

Figure 15:
FIG. 15 illustrates a series of data tables used to derive a likely currency according to an embodiment of the present invention.
Figure 16:
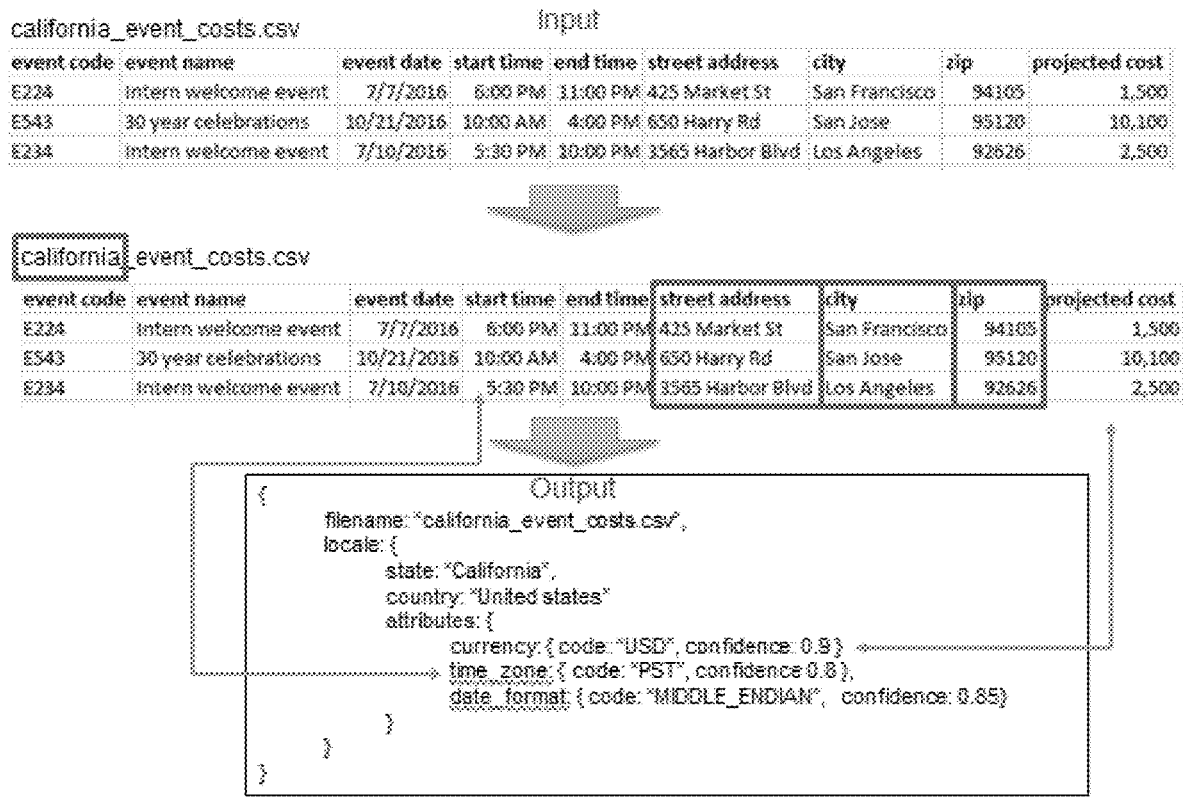
FIG. 16 illustrates a series of data used to derive currency, time zone and date format with a confidence factor for each according to an embodiment of the present invention.

FIG. 15 illustrates a series of data tables used to derive a likely currency according to an embodiment of the present invention. FIG. 16 illustrates a series of data used to derive currency, time zone and date format with a confidence factor for each according to an embodiment of the present invention. With reference to FIG. 15, an embodiment of the present invention teaches a system and method for analyzing different components of a data table, including a filename, to infer with a certain confidence level temporal information associated with the relevant data. For FIG. 15, the filename "san_francisco_budget.csv" may be analyzed to infer that the associated data was created in the North American city of San Francisco, a state of California, a time zone of Pacific Standard Time, and a currency of US dollars.

Embodiments of the present invention provide a computer-implemented method for inferring location attributes from data entries. By this process, a computer selects a representative sample of rows from a table for a first file that includes rows and columns. The computer then identifies location information from the filename of the first file, the column headings of the first file, and/or the rows of the representative sample, using named entity recognition. The computer supplements the identified location information with missing latitude/longitude, address, city, state, country, and/or continent information, using dictionaries and/or geocoding services. Further, the computer determines location attributes based on the identified and supplemented location information, wherein the location attributes include local currency, time zone, and date format, and the process will attempt to associate the determined location attributes with the first file, and merge the first file with a second file, using the location attributes associated with the first file and location attributes associated with the second file to convert data to matching formats, when applicable. Further features and attributes will be discussed in more detail below.

In another embodiment of the present invention relates to a method, and associated computer system and computer program product, of merging data sets where location attributes have been inferred from data entries wherein a first set of data entries has a first set of location attributes and a second set of data entries has a second set of location attributes. One or more processors of a computer system compare the formats of the location values within the first and second sets of location attributes. The one or more processors of the computer system indicate any transformations which need to occur for the first and second sets of location attributes to have matching location value formats. The one or more processors of the computer system merge the first set of data entries with the second set of data entries, wherein the first and second sets of location attributes have matching location value formats.

Figure 17:
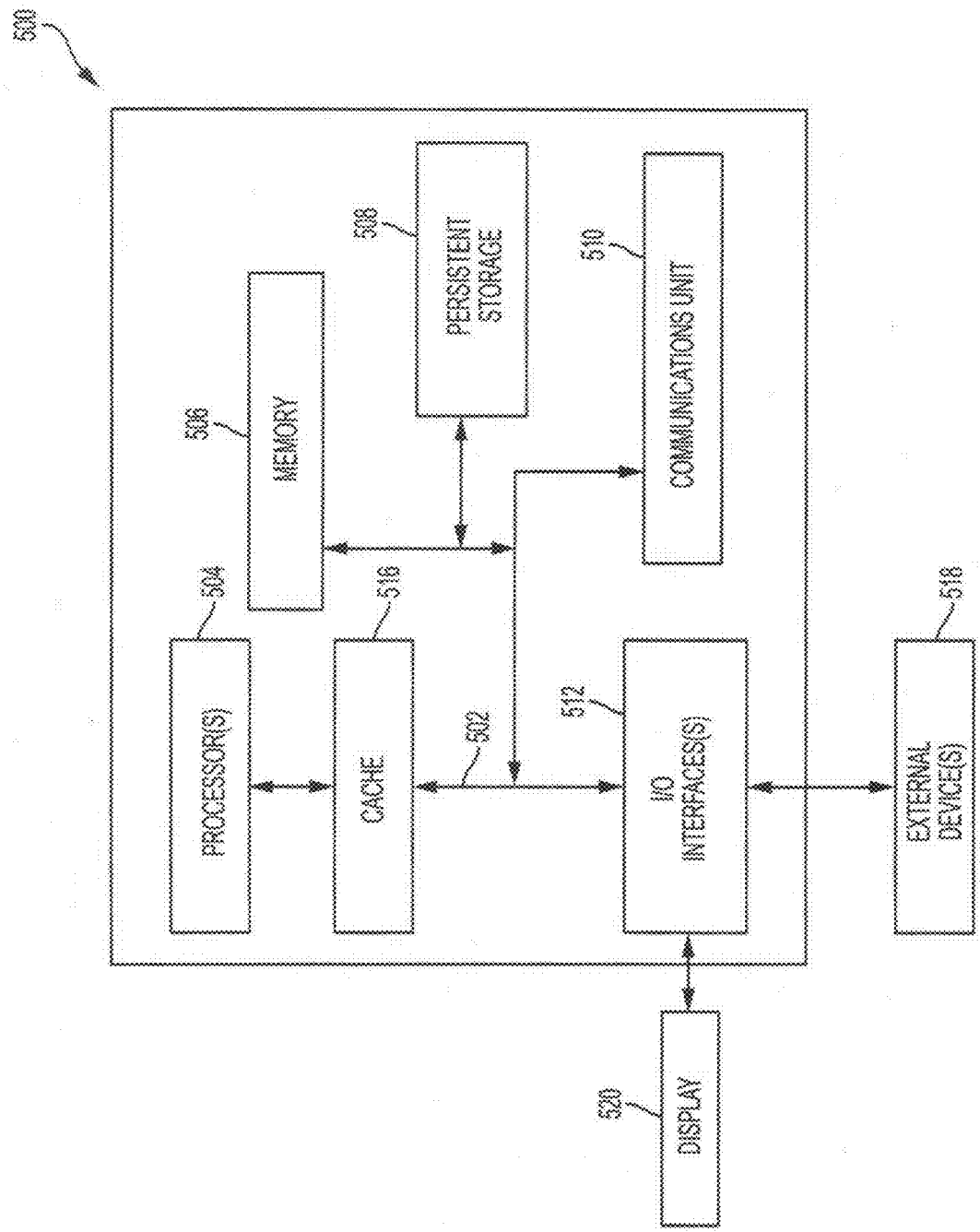
FIG. 17 illustrates a block diagram of internal and external components of a computing device, in accordance with embodiments of the present invention.

FIG. 17 illustrates a block diagram of internal and external components of a computing device, in accordance with embodiments of the present invention. FIG. 17 depicts a block diagram of internal and external components of a computing device, generally designated 500, which is representative of components of computer 100 of FIG. 1, in accordance with an embodiment of the present invention. It should be appreciated that FIG. 17 provides only an illustration of one implementation and does not imply any limitations with regard to the environment in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512.

Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
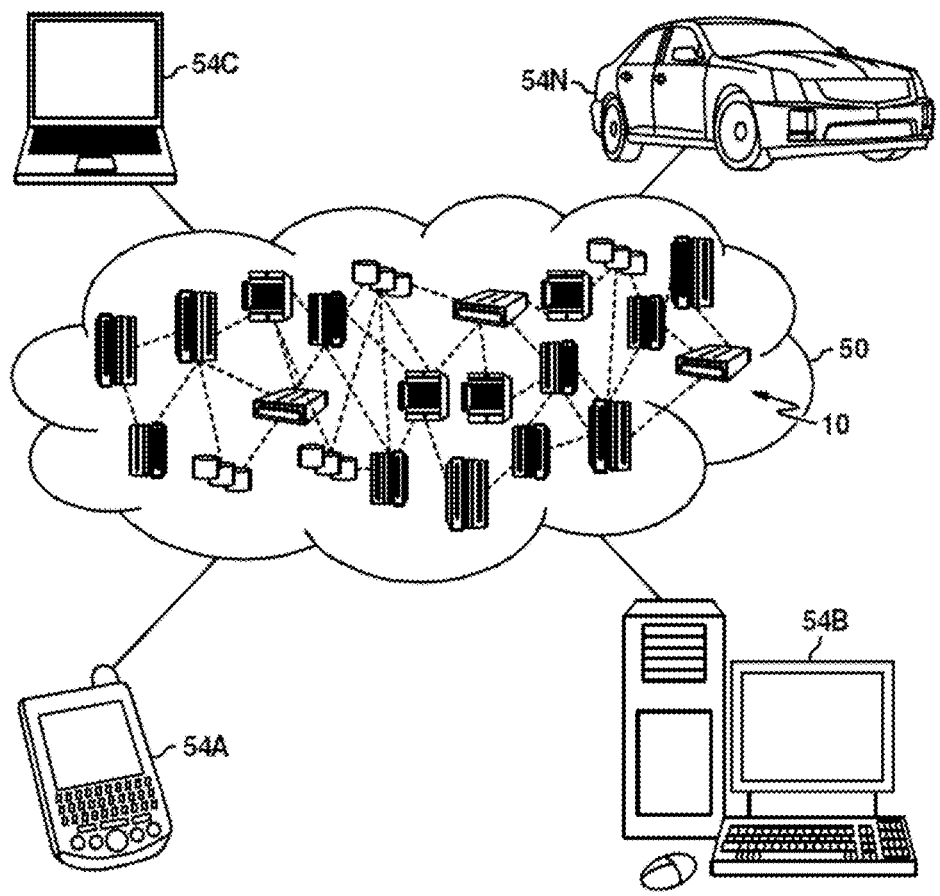
FIG. 18 illustrates a cloud computing environment, in accordance with embodiments of the present invention.

FIG. 18 illustrates a cloud computing environment, in accordance with embodiments of the present invention. Referring now to FIG. 18, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 19:
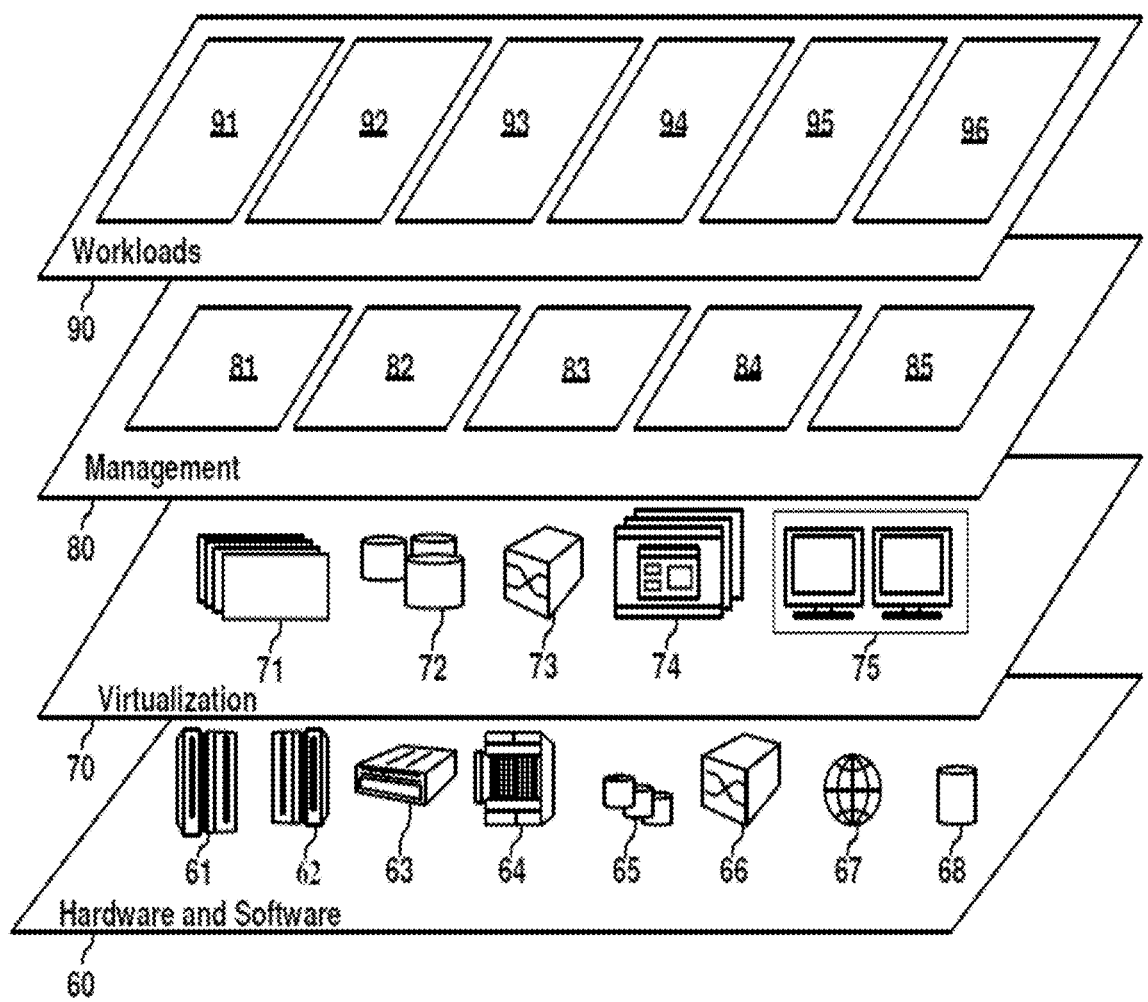
FIG. 19 illustrates abstraction model layers, in accordance with embodiments of the present invention.

FIG. 19 illustrates abstraction model layers, in accordance with embodiments of the present invention. Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software module(s) 96.

Embodiments of present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for data migration utilizing inference of location attributes from data entries in structured data sets, said method comprising:

automatically and simultaneously receiving, from a plurality of servers in a cluster of servers using parallel processing, a first set of data from a first data source and a second set of data from a second data source, said structured data sets comprising the first set of data and the second set of data, said first set of data including first location attributes having first location values in a first format, said second set of data including second location attributes having second location values in a second format;

identifying, by the plurality of servers in the cluster, geospatial and temporal information within the structured data sets utilizing machine learning;

in response to a prior determination that the second format of the second location values does not match the first format of the first location values, automatically and simultaneously identifying, by the plurality of servers in the cluster using the parallel processing and using entity recognition, in the first and second sets of data within the structured data sets, location information pertaining to the first and second location attributes and the first and second location values therein respectively;

automatically and simultaneously determining, by the plurality of servers in the cluster using the parallel processing, implied location information in the first and second sets of data based on the identified location information, wherein the determined implied location information includes N different sets of information in the first set of data or the second set of data, wherein the N sets of information provide N respective different clues suggesting N respective implied values of one location attribute, and wherein N is at least 2;

deriving, by the plurality of servers in the cluster, location values based on the identified location information and the determined implied location information using consolidation rules, resulting in a final set of location attributes and associated location values for the data entries, wherein said deriving location values comprises forming a Venn diagram comprising an intersection of the N respective implied values of the one location attribute and determining that the intersection includes only one implied value of the N respective implied values, and wherein the final set of location attributes and associated location values includes the one location attribute whose associated value is the one implied value included in the intersection, wherein the first set of data or the second set of data includes a file having a filename, wherein the file is formatted as a table, and wherein each respective implied value of the N respective implied values is one or more data items inferred from the filename or inferred from content in a cell in the table;

associating, by plurality of servers in the cluster, the final set of location attributes with the data entries;

automatically and simultaneously transforming, by the plurality of servers in the cluster using the parallel processing, the first and second location attributes and the first and second location values therein respectively, said simultaneously transforming utilizing the implied location information, said simultaneously transforming resulting in a format of the transformed first location values and a format of the transformed second location values being matched, said simultaneously transforming further resulting in the first and second data sets being changed to include the transformed first and second location attributes and the first and second location values therein respectively;

automatically merging, by the plurality of servers in the cluster using the parallel processing, the changed first data set and the changed second data set to form a merged data set; and automatically and simultaneously transmitting, by the plurality of servers in the cluster using the parallel processing, the merged data set to a plurality of computing systems for processing by an application in each computing system, wherein the plurality of servers in the cluster implement the parallel processing by working collectively as a single system in a Hadoop environment;

determining, by the plurality of servers in the cluster, a normalized confidence value for the implied value of each location attribute in the final set of location attributes, said normalized confidence value being indicative a reliability of the implied value of each location attribute in the final set of location attributes, said determining the normalized confidence value, for each implied value, based on how many inferences was relied upon to determine the implied value; and generating, by the plurality of servers in the cluster, an output of the final set of location attributes, said output comprising the implied value and associated normalized confidence value for each location attribute in the final set of location attributes.

2. The method of claim 1, wherein said determining implied location information includes inferring using dictionaries, the implied location information using at least one of: a missing latitude/longitude, a missing address, a missing city, a missing state, a missing country, and a missing time zone.

3. The method of claim 1, wherein the merged data set includes at least one attribute selected from the group consisting of local currency, time zone, country, date format, and combinations thereof.

4. The method of claim 1, said method further comprising:
    determining, by the plurality of servers in the cluster using the parallel processing, a confidence rating for each of the location value within the merged data set; and
    providing, by the plurality of servers in the cluster using the parallel processing, the merged data set with the confidence rating for each location value within the merged data set.

5. A computer program product comprising: a computer-readable storage device and a computer-readable program code stored in the computer-readable storage device, said computer-readable storage device not being a transitory signal, said computer readable program code containing instructions executable by one or more processors of a computer system to implement a method for data migration utilizing inference of location attributes from data entries in structured data sets, said method comprising:
    automatically and simultaneously receiving, from a plurality of servers in a cluster of servers using parallel processing, a first set of data from a first data source and a second set of data from a second data source, said structured data sets comprising the first set of data and the second set of data, said first set of data including first location attributes having first location values in a first format, said second set of data including second location attributes having second location values in a second format;
    identifying, by the plurality of servers in the cluster, geospatial and temporal information within the structured data sets utilizing machine learning;
    in response to a prior determination that the second format of the second location values does not match the first format of the first location values, automatically and simultaneously identifying, by the plurality of servers in the cluster using the parallel processing and using entity recognition, in the first and second sets of data within the structured data sets, location information pertaining to the first and second location attributes and the first and second location values therein respectively;
    automatically and simultaneously determining, by the plurality of servers in the cluster using the parallel processing, implied location information in the first and second sets of data based on the identified location information, wherein the determined implied location information includes N different sets of information in the first set of data or the second set of data, wherein the N sets of information provide N respective different clues suggesting N respective implied values of one location attribute, and wherein N is at least 2;
    deriving, by the plurality of servers in the cluster, location values based on the identified location information and the determined implied location information using consolidation rules, resulting in a final set of location attributes and associated location values for the data entries, wherein said deriving location values comprises forming a Venn diagram comprising an intersection of the N respective implied values of the one location attribute and determining that the intersection includes only one implied value of the N respective implied values, and wherein the final set of location attributes and associated location values includes the one location attribute whose associated value is the one implied value included in the intersection, wherein the first set of data or the second set of data includes a file having a filename, wherein the file is formatted as a table, and wherein each respective implied value of the N respective implied values is one or more data items inferred from the filename or inferred from content in a cell in the table;
    associating, by plurality of servers in the cluster, the final set of location attributes with the data entries;
    automatically and simultaneously transforming, by the plurality of servers in the cluster using the parallel processing, the first and second location attributes and the first and second location values therein respectively, said simultaneously transforming utilizing the implied location information, said simultaneously transforming resulting in a format of the transformed first location values and a format of the transformed second location values being matched, said simultaneously transforming further resulting in the first and second data sets being changed to include the transformed first and second location attributes and the first and second location values therein respectively;
    automatically merging, by the plurality of servers in the cluster using the parallel processing, the changed first data set and the changed second data set to form a merged data set; and
    automatically and simultaneously transmitting, by the plurality of servers in the cluster using the parallel processing, the merged data set to a plurality of computing systems for processing by an application in each computing system, wherein the plurality of servers in the cluster implement the parallel processing by working collectively as a single system in a Hadoop environment;
    determining, by the plurality of servers in the cluster, a normalized confidence value for the implied value of each location attribute in the final set of location attributes, said normalized confidence value being indicative a reliability of the implied value of each location attribute in the final set of location attributes, said determining the normalized confidence value, for each implied value, based on how many inferences was relied upon to determine the implied value; and
    generating, by the plurality of servers in the cluster, an output of the final set of location attributes, said output comprising the implied value and associated normalized confidence value for each location attribute in the final set of location attributes.

6. The computer program product of claim 5, wherein said determining implied location information includes inferring using dictionaries, the implied location information using at least one of: a missing latitude/longitude, a missing address, a missing city, a missing state, a missing country, and a missing time zone.

7. The computer program product as recited in claim 5, said method further comprising:
 determining, by the plurality of servers in the cluster using the parallel processing, a confidence rating for each of the location value within the merged data set; and
 providing, by the plurality of servers in the cluster using the parallel processing, the merged data set with the confidence rating for each location value within the merged data set.

8. A computer system, comprising: one or more processors; a memory coupled to the one or more processors; and a computer readable storage device coupled to the one or more processors, said storage device containing instructions executable by the one or more processors via the memory to implement a method for data migration utilizing inference of location attributes from data entries in structured data sets, said method comprising:
 automatically and simultaneously receiving, from a plurality of servers in a cluster of servers using parallel processing, a first set of data from a first data source and a second set of data from a second data source, said structured data sets comprising the first set of data and the second set of data, said first set of data including first location attributes having first location values in a first format, said second set of data including second location attributes having second location values in a second format;
 identifying, by the plurality of servers in the cluster, geospatial and temporal information within the structured data sets utilizing machine learning;
 in response to a prior determination that the second format of the second location values does not match the first format of the first location values, automatically and simultaneously identifying, by the plurality of servers in the cluster using the parallel processing and using entity recognition, in the first and second sets of data within the structured data sets, location information pertaining to the first and second location attributes and the first and second location values therein respectively;
 automatically and simultaneously determining, by the plurality of servers in the cluster using the parallel processing, implied location information in the first and second sets of data based on the identified location information, wherein the determined implied location information includes N different sets of information in the first set of data or the second set of data, wherein the N sets of information provide N respective different clues suggesting N respective implied values of one location attribute, and wherein N is at least 2;
 deriving, by the plurality of servers in the cluster, location values based on the identified location information and the determined implied location information using consolidation rules, resulting in a final set of location attributes and associated location values for the data entries, wherein said deriving location values comprises forming a Venn diagram comprising an intersection of the N respective implied values of the one location attribute and determining that the intersection includes only one implied value of the N respective implied values, and wherein the final set of location attributes and associated location values includes the one location attribute whose associated value is the one implied value included in the intersection, wherein the first set of data or the second set of data includes a file having a filename, wherein the file is formatted as a table, and wherein each respective implied value of the N respective implied values is one or more data items inferred from the filename or inferred from content in a cell in the table;
 associating, by plurality of servers in the cluster, the final set of location attributes with the data entries;
 automatically and simultaneously transforming, by the plurality of servers in the cluster using the parallel processing, the first and second location attributes and the first and second location values therein respectively, said simultaneously transforming utilizing the implied location information, said simultaneously transforming resulting in a format of the transformed first location values and a format of the transformed second location values being matched, said simultaneously transforming further resulting in the first and second data sets being changed to include the transformed first and second location attributes and the first and second location values therein respectively;
 automatically merging, by the plurality of servers in the cluster using the parallel processing, the changed first data set and the changed second data set to form a merged data set; and
 automatically and simultaneously transmitting, by the plurality of servers in the cluster using the parallel processing, the merged data set to a plurality of computing systems for processing by an application in each computing system, wherein the plurality of servers in the cluster implement the parallel processing by working collectively as a single system in a Hadoop environment;
 determining, by the plurality of servers in the cluster, a normalized confidence value for the implied value of each location attribute in the final set of location attributes, said normalized confidence value being indicative a reliability of the implied value of each location attribute in the final set of location attributes, said determining the normalized confidence value, for each implied value, based on how many inferences was relied upon to determine the implied value; and
 generating, by the plurality of servers in the cluster, an output of the final set of location attributes, said output comprising the implied value and associated normalized confidence value for each location attribute in the final set of location attributes.

9. The method of claim 1, wherein one respective implied value of the N respective implied values is a plurality of data items.

10. The method of claim 1, wherein one respective implied value of the N respective implied values is inferred from the filename.

11. The method of claim 1, wherein one respective implied value of the N respective implied values is inferred from content in one cell in the table.

12. The method of claim 1, wherein N is at least 3.

13. The computer program product of claim 5, wherein one respective implied value of the N respective implied values is a plurality of data items.

14. The computer program product of claim 5, wherein one respective implied value of the N respective implied values is inferred from the filename.

15. The computer program product of claim 5, wherein one respective implied value of the N respective implied values is inferred from content in one cell in the table.

16. The computer program product of claim 5, wherein N is at least 3.

17. The computer system of claim 8, wherein one respective implied value of the N respective implied values is a plurality of data items.

18. The computer system of claim 8, wherein one respective implied value of the N respective implied values is inferred from the filename.

19. The computer system of claim 8, wherein one respective implied value of the N respective implied values is inferred from content in one cell in the table.

20. The computer system of claim 8, wherein N is at least 3.

* * * * *